Oct. 22, 1929.  J. MORCH  1,733,068
FLEXIBLE DRIVE FOR ELECTRIC LOCOMOTIVES
Filed Feb. 7, 1928  2 Sheets-Sheet 1

Inventor
John Morch,
By N. E. Gee
Attorney

Oct. 22, 1929.   J. MORCH   1,733,068
FLEXIBLE DRIVE FOR ELECTRIC LOCOMOTIVES
Filed Feb. 7, 1923   2 Sheets-Sheet 2
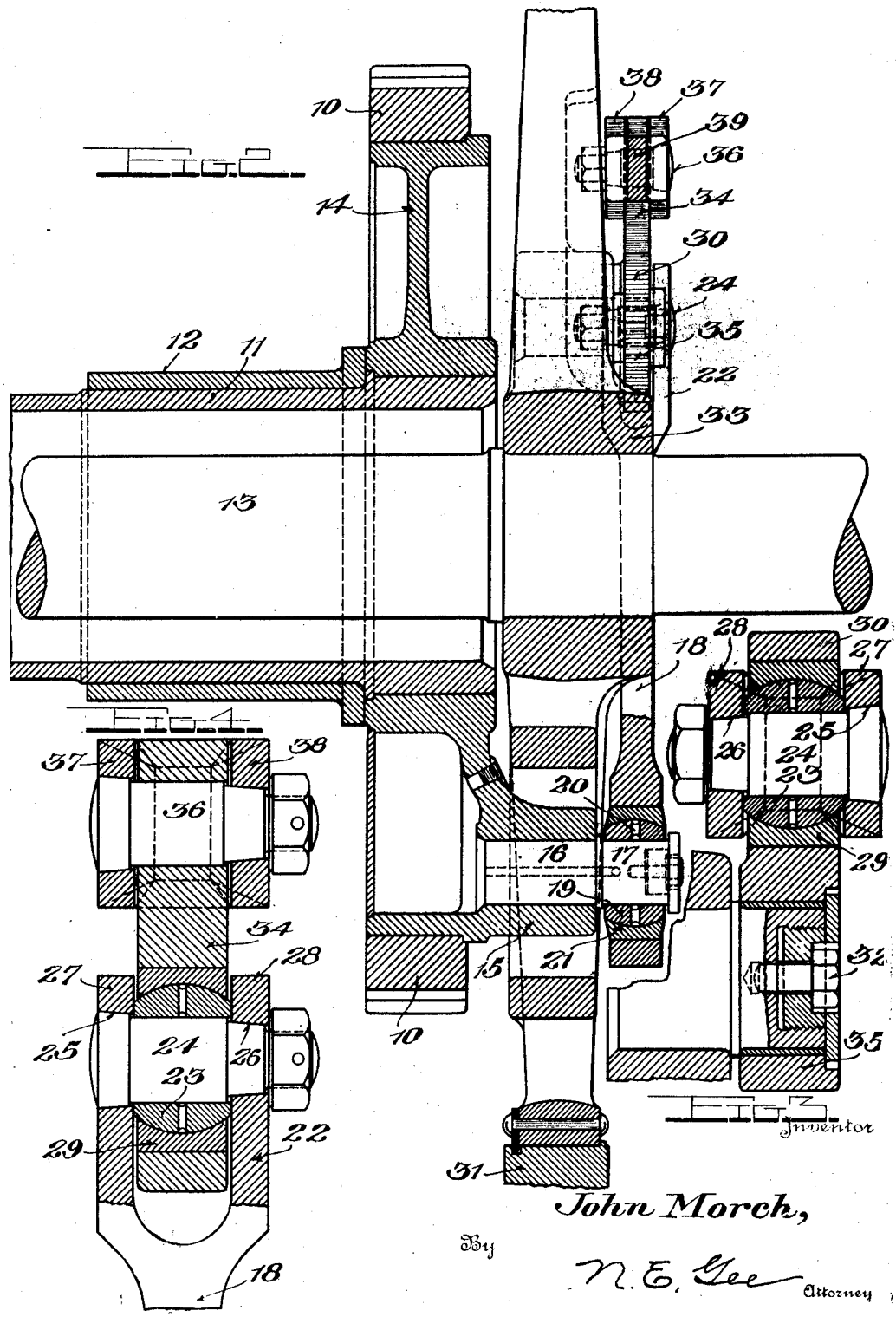
Inventor
John Morch,
By
N. E. Gee
Attorney Patented Oct. 22, 1929

1,733,068

UNITED STATES PATENT OFFICE

JOHN MORCH, OF ALTOONA, PENNSYLVANIA

FLEXIBLE DRIVE FOR ELECTRIC LOCOMOTIVES

Application filed February 7, 1928. Serial No. 252,603.

This invention relates to electric locomotives and has for its primary object an improved means for transmitting the motor torque to the driving wheels of the locomotive under varying conditions of track and locomotive operation.

Another object of this invention is, to provide a flexible drive for electric locomotives that embodies a minimum number of parts, thus reducing the first cost and the maintenance to a minimum.

A further object of this invention is, to provide a simple flexible drive that has means for transmitting motor torque to the driving wheels, while the locomotive rolls from one side to the other on the spring gear, due to track conditions and inequalities in the spring gear arrangement.

A still further object of this invention is, to provide an improved flexible drive for electric locomotives in combination with a spring gear arrangement, whereby the motor quill is normally held concentric with the driving axle, together with means for transferring the motor torque from the spring supported parts of the locomotive to the non-spring supported driving wheels.

With these and many other objects in view, which will be more readily apparent as the nature of the invention is better understood, the same consists in the novel construction, combination and arrangement of parts as will be hereinafter fully pointed out, illustrated and claimed.

It will be quite readily understood by those skilled in the art to which this invention belongs, that the same is susceptible to some structural changes and modifications without departing from the spirit or scope of the invention, but a preferred and practical embodiment of the invention is shown in the accompanying drawings, in which—

Fig. 2 shows a cross-sectional view taken on the line 3—3 of Fig. 1, and readily shows the relation between the driving gear, the quill, the driving axle and the driving wheel.

Fig. 3 is a cross-sectional view taken on the line 4—4 of Fig. 1, and shows the universal ball and socket connection through which the driving link is attached to the crank.

Fig. 4 shows a cross-sectional view taken on the line 5—5 of Fig. 1, and shows the means of attaching the driving link, as well as the horizontal connecting link to one of the bell cranks.

Similar reference numerals refer to similar parts throughout the several figures of the drawings.

Figure 1:
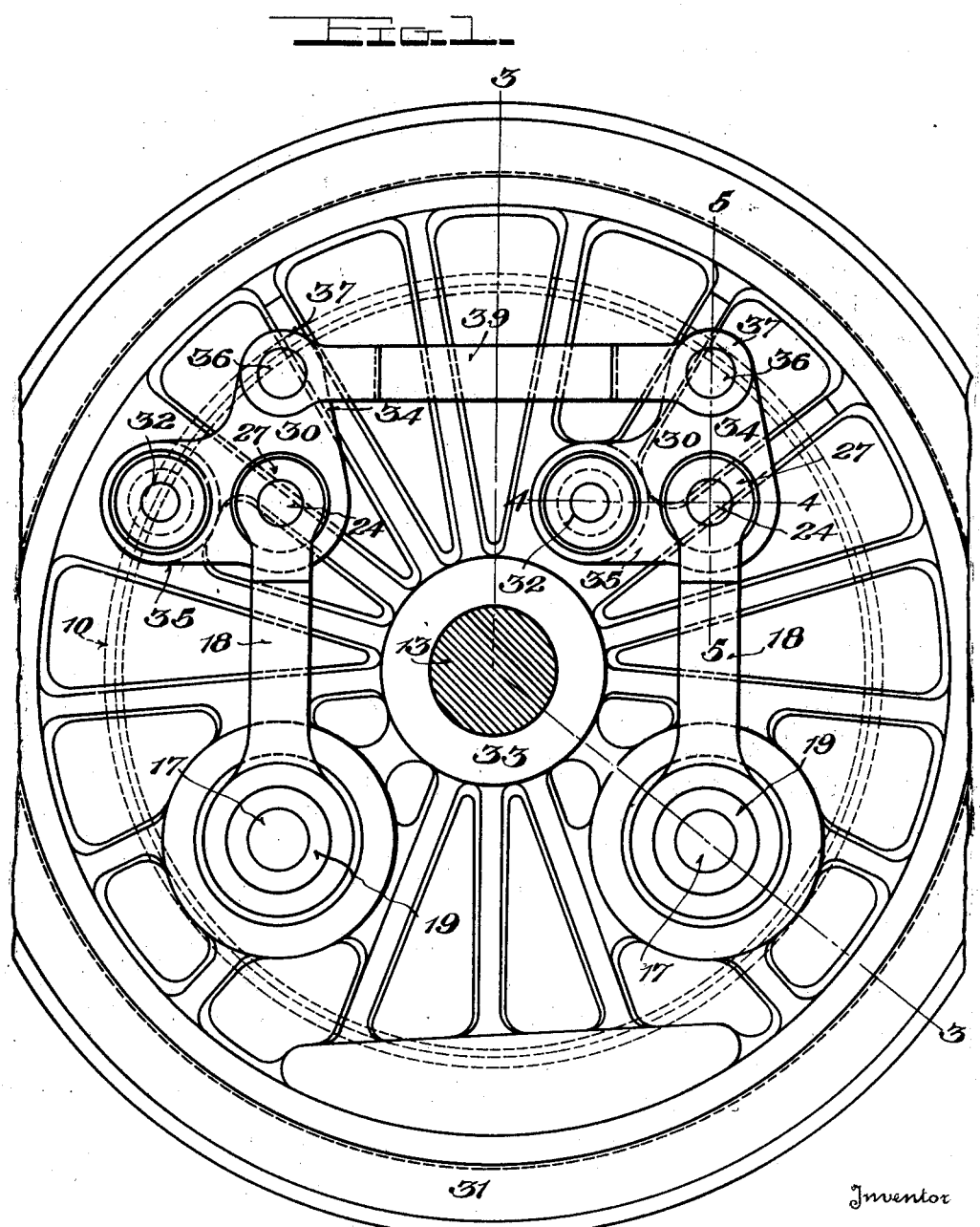
Fig. 1 shows a side elevation of an electric locomotive driving wheel having my improved flexible drive applied thereto.

In carrying out this invention in a practical way, I have shown the same applied to a locomotive, having the driving gear designated by the numeral 10; applied to a quill 11, which has fitted thereto a motor bearing 12. The quill 11 and associated parts, carried by the spring gear of the locomotive, are, therefore, spring borne, and are adapted to be held normally concentric with the axle 13, as shown in Fig. 2 of the drawings.

The gear center 14, on which the driving gear rim is positioned, is provided with a plurality of bosses 15, through which pass driving pins 16; the outer end 17, of which carries a driving rod 18, having fitted thereto a bearing 19 formed as a truncated sphere, and provided with perforations 20 through which lubricant is permitted to pass to the outer surface 21 of the sphere 19, as shown in Fig. 2 of the drawings. The bosses 15 extend through openings in the driving wheel 31 which openings are larger than said bosses whereby the driving wheel may shift relatively to the driving gear.

The opposite end of the driving rod 18 is bifurcated as shown in Figures 3 and 4 of the drawings.

The bifurcated end 22, of the driving rod 18, is formed to co-act with a truncated sphere 23, through which passes a pin 24, having tapered ends 25 and 26, each of which engage the jaw members 27 and 28, respectively, of the rod end 22. The sphere 23 is thus rotatably mounted in a socket member 29, positioned in a bell crank 30, as shown in Fig. 1 of the drawings. The bell crank 30, is fulcrumed on the driving wheel 31, through the medium of a pin 32, which is pressed into the wheel center 33, as shown in Figures 1 and 3 of the drawings.

The bell crank 30 is provided with an arm 34, positioned at right angles to the arm 35 which engages the fulcrum pin 32. The arm 34 is provided with a perforation through which a pin 36 is adapted to pass, and draw the two jaw members 37 and 38 of the link 39 together on a pin 36.

The link 39 is bifurcated at both ends and each is adapted to engage with an upright arm 34 of the bell crank 30, thus completing the drive as illustrated.

From the above description and illustrations, it will be readily seen, that the driving wheel can easily follow the rail over uneven track while the driving gear, which is spring borne, remains in a plane parallel to the road bed. The locomotive is thus free to roll from one side to the other, due to the road-bed and track conditions, and the drive not effected, as the uniform transmission of the motor torque is obtained through the above arrangement of flexible drive, which thus permits the driving wheel to move in any plane, due to rail and road-bed conditions.

It will be observed further, that when this drive is applied to a locomotive, the torque exerted by the motor, is transmitted through the pin 17 of the driving gear to the links 18, thence to the bell cranks positioned on the driving wheel, and by virtue of the horizontal link connecting the two bell cranks, the wheel is rotated with the driving gear. It will further be observed, that when uneven track is passed over, as for instance, a low rail joint, the driving wheel will drop, taking the fulcrum pins with the wheel, while the bell cranks will rise, carrying the horizontal link therewith.

Having thus described my invention, what I claim and desire to be secured by Letters Patent is:

1. In combination with a motor-driven locomotive, a driving wheel; a driving wheel axle; a motor quill in which the driving axle rotates; a driving gear positioned on the motor quill; driving pins positioned in the driving gears; means for permitting the driving pins to pass through the driving wheels; driving links positioned on the driving pins; universal joints between the driving pin and driving link; bell cranks positioned on the driving wheels; universal joints positioned between the driving link and the bell crank; a link connecting the arms of the bell crank, said link carrying compressive strains when the locomotive moves in one direction, and tension strains when moving in the opposite direction, and means for lubricating the flexible drive.

2. In combination with a flexible drive for electric locomotives, a driving gear; a quill, a driving axle; a driving wheel positioned on the driving axle; driving pins positioned in the driving gear; links positioned on the pins; bifurcated ends on the links, right angled bell cranks engaging with the bifurcated ends of the links; fulcrum pins positioned in the driving wheel and engaging one leg of each bell crank, and a link having pin connections at either end which connects the bell cranks.

In testimony whereof I affix my signature.

JOHN MORCH.